US007191965B2

(12) United States Patent
Neier et al.

(10) Patent No.: US 7,191,965 B2
(45) Date of Patent: Mar. 20, 2007

(54) MATERIAL SPREADER AND METHOD FOR USING SAME

(75) Inventors: Benjamin R. Neier, Dodge City, KS (US); Rodney R. Neier, Dodge City, KS (US); Gregory R. Reimer, Dodge City, KS (US); David J. Brouwer, Prinsburg, MN (US); Luke D. Prouty, Montevideo, MN (US); Elizabeth B. Rheingans, Correll, MN (US); Jeff A. Schultz, Montevideo, MN (US); Jason M. Schwiderski, Benson, MN (US); Barbara M. Springman, New London, MN (US); Jeremy J. Waltz, Montevideo, MN (US); David J. Gelhar, DeGraff, MN (US); Kevin R. Wald, Montevideo, MN (US); Todd E. Osman, Montevideo, MN (US); James E. Shafer, Dodge City, KS (US); Ross M. Groening, Dodge City, KS (US)

(73) Assignee: Roto-Mix, LLC, Dodge City, KS (US)

( * ) Notice: Subject to any disclaimer, the term of this patent is extended or adjusted under 35 U.S.C. 154(b) by 0 days.

(21) Appl. No.: 11/224,174

(22) Filed: Sep. 12, 2005

(65) Prior Publication Data
US 2006/0169806 A1 Aug. 3, 2006

Related U.S. Application Data

(63) Continuation-in-part of application No. 10/673,625, filed on Sep. 29, 2003.

(51) Int. Cl.
*A01C 17/00* (2006.01)

(52) U.S. Cl. ............... 239/667; 239/664; 239/671; 239/672; 239/677; 239/679; 239/682

(58) Field of Classification Search ............... 239/661, 239/664, 667, 669, 672, 673, 679, 681, 682, 239/671, 677
See application file for complete search history.

(56) References Cited

U.S. PATENT DOCUMENTS

| 3,333,574 | A |   | 8/1967  | Harris          |         |
|-----------|---|---|---------|-----------------|---------|
| 3,754,528 | A |   | 8/1973  | Downing         |         |
| 4,593,555 | A |   | 6/1986  | Krutz et al.    |         |
| 4,732,330 | A | * | 3/1988  | Groeneveld et al. | 239/672 |
| 5,170,948 | A | * | 12/1992 | Glick et al.    | 239/679 |
| 5,469,797 | A |   | 11/1995 | Hearne, Jr.     |         |
| 5,501,404 | A | * | 3/1996  | Meyer et al.    | 239/682 |
| 6,092,745 | A | * | 7/2000  | Seymour et al.  | 239/673 |
| 6,143,183 | A |   | 11/2000 | Wardwell et al. |         |

* cited by examiner

*Primary Examiner*—Steven J. Ganey
(74) *Attorney, Agent, or Firm*—McKee, Voorhees & Sease, P.L.C.

(57) ABSTRACT

A material spreader includes a belt/chain assembly. The belt is mounted within the chamber of the material spreader and the chain remains out of contact with the material during the operation of the device. A sliding barrier is mounted at the rear of the belt, and moves from a forward position adjacent the front of the spreader to a rear position adjacent the rear of the spreader. One form of the hydraulic system utilizes a sensor for built up pressure within independently driven augers. In response to this pressure build up the sliding barrier speed is reduced.

10 Claims, 7 Drawing Sheets

MATERIAL SPREADER AND METHOD FOR USING SAME

CROSS REFERENCE TO EARLIER APPLICATIONS

This is a continuation-in-part of pending application Ser. No. 10/673,625, filed Sep. 29, 2003, herein incorporated by reference.

BACKGROUND OF THE INVENTION

This invention relates to a material spreader and method for using same. It may be used for spreading manure, compost, sludge, paunch or other materials. Conventional material spreaders utilize a series of horizontal bars extending laterally across the floor of the spreader box. These bars move by chains in a rearward direction so as to carry the material rearwardly where it is spread by various types of rotating members.

One disadvantage of the present method for conveying the material to the rear of the spreader is that if a chain breaks or is damaged in any way, the entire contents must be removed from the wagon in order to make any repair.

Another disadvantage of prior methods relates to the feed mechanism for feeding the material to upstanding augers which spread the material to the rear of the spreader. If the feed mechanism moves too fast it can overload the spread augers and damage them.

Another disadvantage of prior methods of operating the upstanding spreading augers is that the two augers are driven by a single power source, whether that single power source be mechanical, electrical, hydraulic or pneumatic. This single source is used in order to coordinate the two augers. Without this coordination there is often high vibration resulting from rotation of the two augers.

Therefore, a primary object of the present invention is the provision of an improved material spreader and method for using same.

A further object of the present invention is the provision of an improved material spreader which utilizes a belt that spans the width of the material spreader box.

A further object of the present invention is the provision of a material spreader and method for using same which maintains a chain drive for moving a belt, wherein the chain drive is never exposed to the material carried by the belt.

A further object of the present invention is the provision of an improved material spreader and method for using same which utilizes a sliding barrier at the rear of the belt for moving the material in a rearward direction for discharge from the material spreader.

A further object of the present invention is to provide a sensor for sensing overload of the spreading augers and reduction of the feeding mechanism in response thereto.

A further object of the present invention is to provide separate and independent drive systems for each of the spreading augers.

A further object of the present invention is to reduce the vibration which normally results from rotation of the two spreading augers at the same time by driving the two augers independently of one another.

A further object of the present invention is the provision of a material spreader and method for using same which is economical to manufacture, durable in use, and efficient in operation.

BRIEF SUMMARY OF THE INVENTION

The foregoing objects may be achieved by a material spreader comprising a material spreader box having a bottom wall, opposite sidewalls, a front wall, and a rear wall forming a material storage chamber for storing a quantity of material. The bottom wall includes opposite side edges from which the opposite sidewalls extend upwardly. The bottom wall also includes a front end from which the front wall extends upwardly. A discharge opening is adjacent the rear end of the bottom wall. A conveyor belt is superimposed over the bottom wall and is positioned for supporting a quantity of material contained within the material storage chamber. The conveyor belt has a width that causes the conveyor belt to substantially completely cover the width of the bottom wall. A drive mechanism is connected to the conveyor belt for moving the conveyor belt relative to the bottom wall in a rearward direction toward the rear wall of the material spreader box whereby the conveyor belt will carry the quantity of material within the material storage chamber in a rearward direction and will discharge the material through the discharge opening at the rear end of the bottom wall. A beater assembly is mounted to the rear of the box for engaging and spreading the material exiting from the discharge opening.

According to another feature of the invention the drive mechanism comprises a chain and sprocket assembly connected to the conveyor belt.

According to another feature of the invention the chain and sprocket assembly is located outside the material storage chamber and is free from contact with the quantity of material stored within the material storage chamber.

According to another feature of the present invention the beater assembly comprises a plurality of beater bars mounted to the material spreader box for rotation about a plurality of upstanding axes.

According to another feature of the present invention the beater bars rotate about a plurality of horizontal axes.

According to another feature of the present invention a first roller and a second roller are spaced apart from one another and are mounted for rotation about first and second roller axes respectively. The conveyor belt is trained around at least one of the first and second rollers.

According to another feature of the present invention the chain and sprocket assembly comprises a sprocket on at least one of the first and second rollers and a chain engaging the sprocket for causing rotation of one of the first and second rollers.

The method of the present invention involves mounting a conveyor belt within the material chamber in close covering relation over the bottom wall and substantially covering the width of the bottom wall. A quantity of material is inserted within the material chamber so that the quantity of material rests upon the conveyor belt. The conveyor belt is moved towards the discharge opening in the rear wall whereby the quantity of material will be moved toward and discharged from the material chamber through the discharge opening. The material being discharged from the discharge opening is engaged and spread with rotating beater bars mounted to the rear of the rear wall of the material spreader box.

According to another feature of the present invention a method for spreading a quantity of material comprises rotating a first auger with a first auger drive and simultaneously rotating a second auger with the second drive independently of the first auger drive.

According to another feature of the present invention the first and second auger drives are hydraulic motors and the method comprises sensing the hydraulic pressure within the first and second hydraulic motors. Then the method comprises slowing the rate of the feed mechanism between the first and second positions in response to sensing an increase in the hydraulic pressure from the normal hydraulic pressure sensed in either the first and second hydraulic motors.

According to another feature of the present invention the material spreader includes a material spreader box having a bottom wall and opposite side walls forming a storage chamber for storing the quantity of material. At least a first upstanding auger and second upstanding auger are mounted to the spreader box for rotation of about first and second upstanding axis respectively. A first auger drive is provided for causing the first upstanding auger to rotate, and a second auger drive is used for causing the second upstanding auger to rotate. The first and second auger drives are independent from one another. A feed mechanism within the spreader box is movable between first and second positions to cause the quantity of material within the chamber to be fed to the first and second upstanding augers for spreading the material on the ground during the rotation of the first and second augers.

According to another feature of the present invention the sensor is responsive to pressure build up in either of the first and second hydraulic motors to cause the feed mechanism to slow down its movement between the first and second positions.

DETAILED DESCRIPTION OF THE PREFERRED EMBODIMENT

Figure 2:
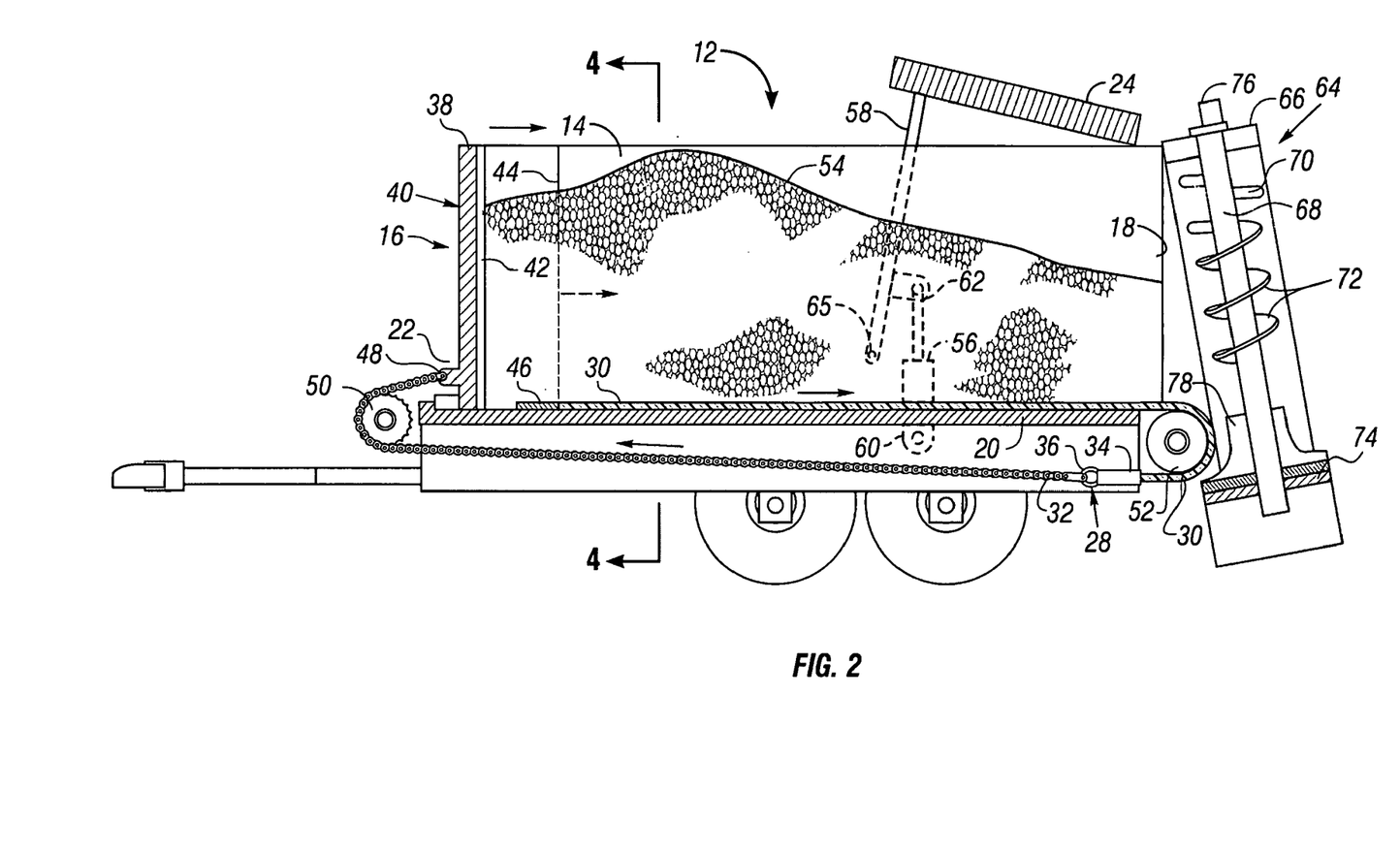
FIG. 2 is a longitudinal sectional view of the material spreader shown in FIG. 1.

Referring to the drawings, the numeral 10 generally designates a material spreader made according to the present invention. Material spreader 10 includes a spreader box 12 comprising opposite sidewalls 14, an open front 16, and an open rear end 18 (FIG. 2). Bottom wall 20 provides a floor for the spreader box 12.

Figure 1:
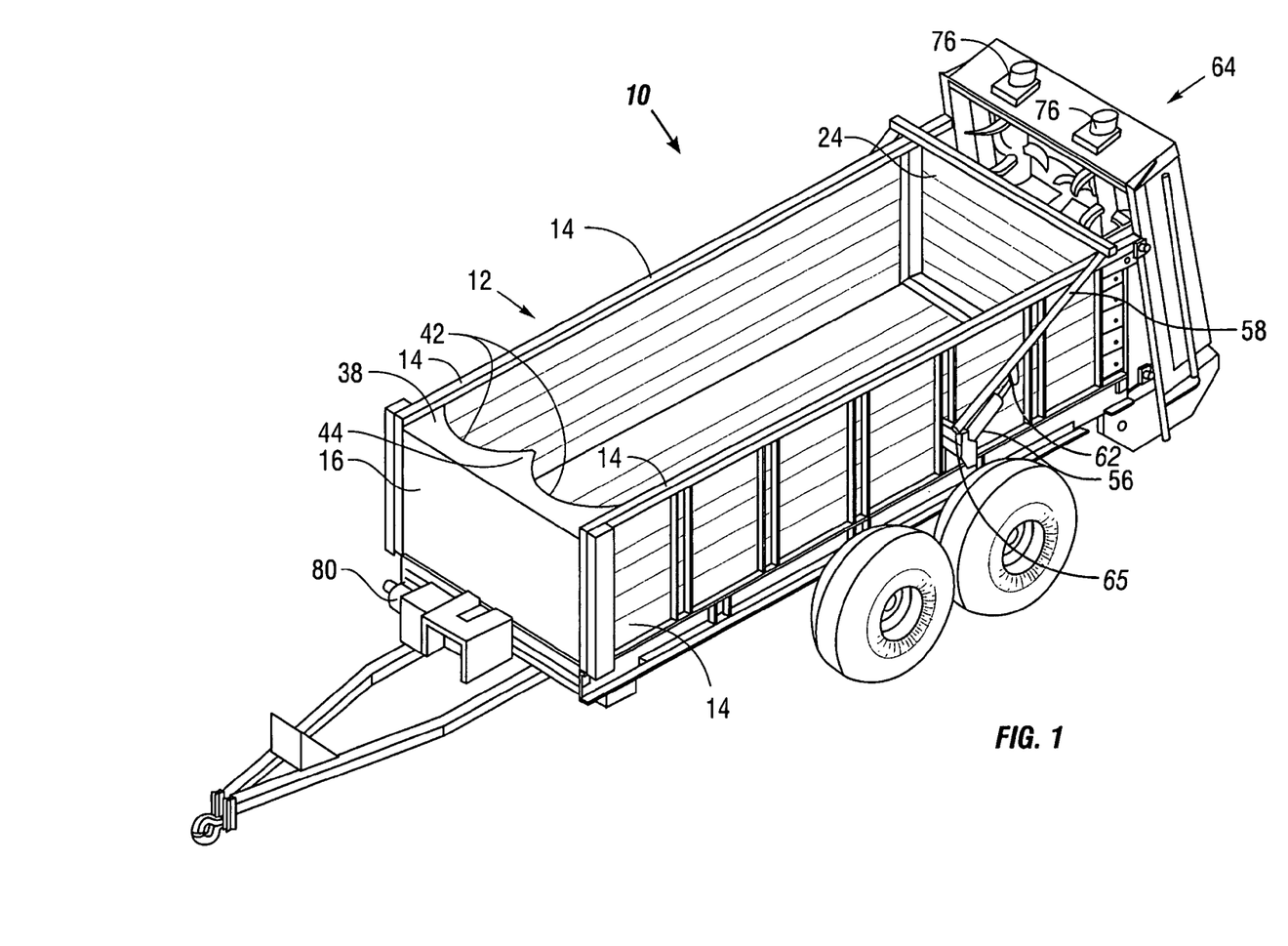
FIG. 1 is a perspective view of the material spreader of the present invention.

A moveable gate 24 is mounted over the open rear end 18 and is capable of vertical pivoting movement from the position shown in FIG. 1 to the position shown in FIG. 2. A belt/chain assembly 28 comprises a belt 30 and a chain 32. Belt 30 is connected to the chain at its forward end by means of a connecting bar 34. Connecting bar 34 includes a chain loop 36 which receives one end of the chain 32. The rear end of the chain 32 is connected to a sliding barrier 38 having a flat rear face 40 and having a double concave front face 42 with a ridge 44 there between. The double concave front face 42 of the sliding barrier 38 includes a belt connection 46 which is connected to the rear end of the belt 30. A chain connector 48 extends from the rear face 40 of the sliding barrier 38 and is connected to the rear end of the chain 32.

Chain 32 is trained around a chain drive sprocket 50 at the front of the material spreader 10. Sprocket 50 is mounted for rotation about a horizontal axis. A belt roller 52 is mounted at the rear of the material spreader 10 and is adapted for rotation about a horizontal axis parallel to the horizontal axis of sprocket 50. The belt/chain assembly is trained around sprocket 50 and roller 52, with the chain being engaged with the sprocket 50 and with the belt 30 being trained around the roller 52. A material load 54 is deposited within the spreader box 12.

A pair of gate lifting cylinders 56 are attached at their lower ends to the spreader box 12 at 60 and are attached at their upper end to an upper connection 62 on arms 58. Each arm 58 is pivoted at its lower end about axis 65 and is rigidly connected at its upper end to gate 24. Extension of this cylinder 56 causes the gate 24 to be lifted upwardly, thereby exposing the open rear end 18 which comprises a discharge end for discharging the material 54 within the spreader box 12.

Figure 5:
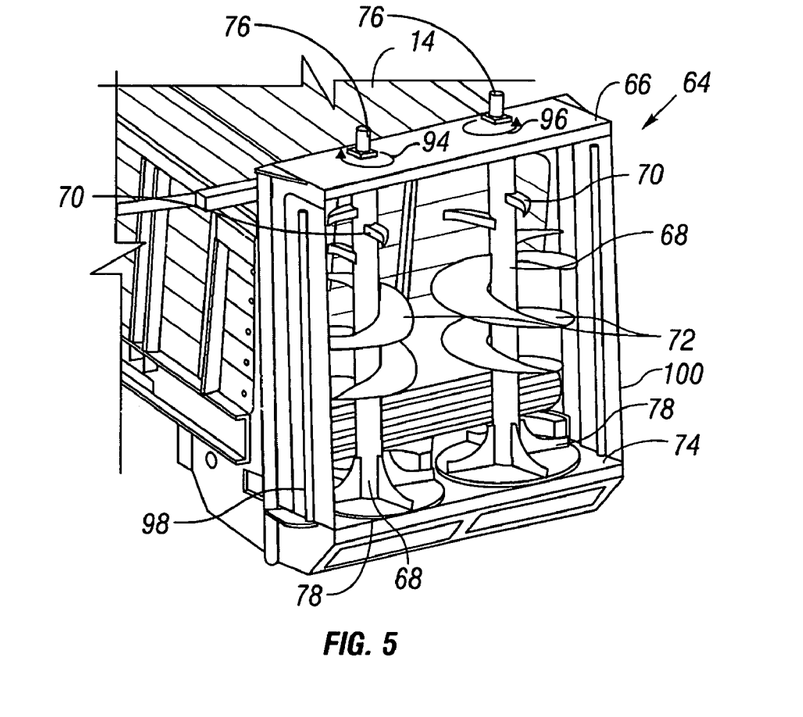
FIG. 5 is a perspective view of the vertically oriented beater bar assembly.

Mounted rearwardly of the gate 24 is a beater assembly 64 which includes a frame 66 and two or more rotatable shafts 68 on which are mounted beater bars 70 and flighting 72. Adjacent the bottom of each shaft 68 is a rotatable bottom plate 74. Each shaft 68 is attached to, and driven by, a hydraulic motor 76, and each bottom plate 74 includes a plurality of spreader flanges 78. The hydraulic motors 76 rotate the shafts 68, and cause the flightings 72, the beater bars 70, and the spreader flange 78 to rotate and to engage the material exiting from the discharge opening 18. The material as a result of this rotation is spread rearwardly from the material spreader. Motor 76 drives the left shaft 68 (as viewed in FIG. 5) in a clockwise direction as indicated by arrow 94. The other motor 76 drives the right shaft 68 in a counterclockwise direction as indicated by arrow 96. Assembly 64 also includes opposite lateral wings 98, 100 (FIG. 5) which are pivotally mounted so as to adjust the spread pattern of material 54 exiting from assembly 64.

Figure 3:
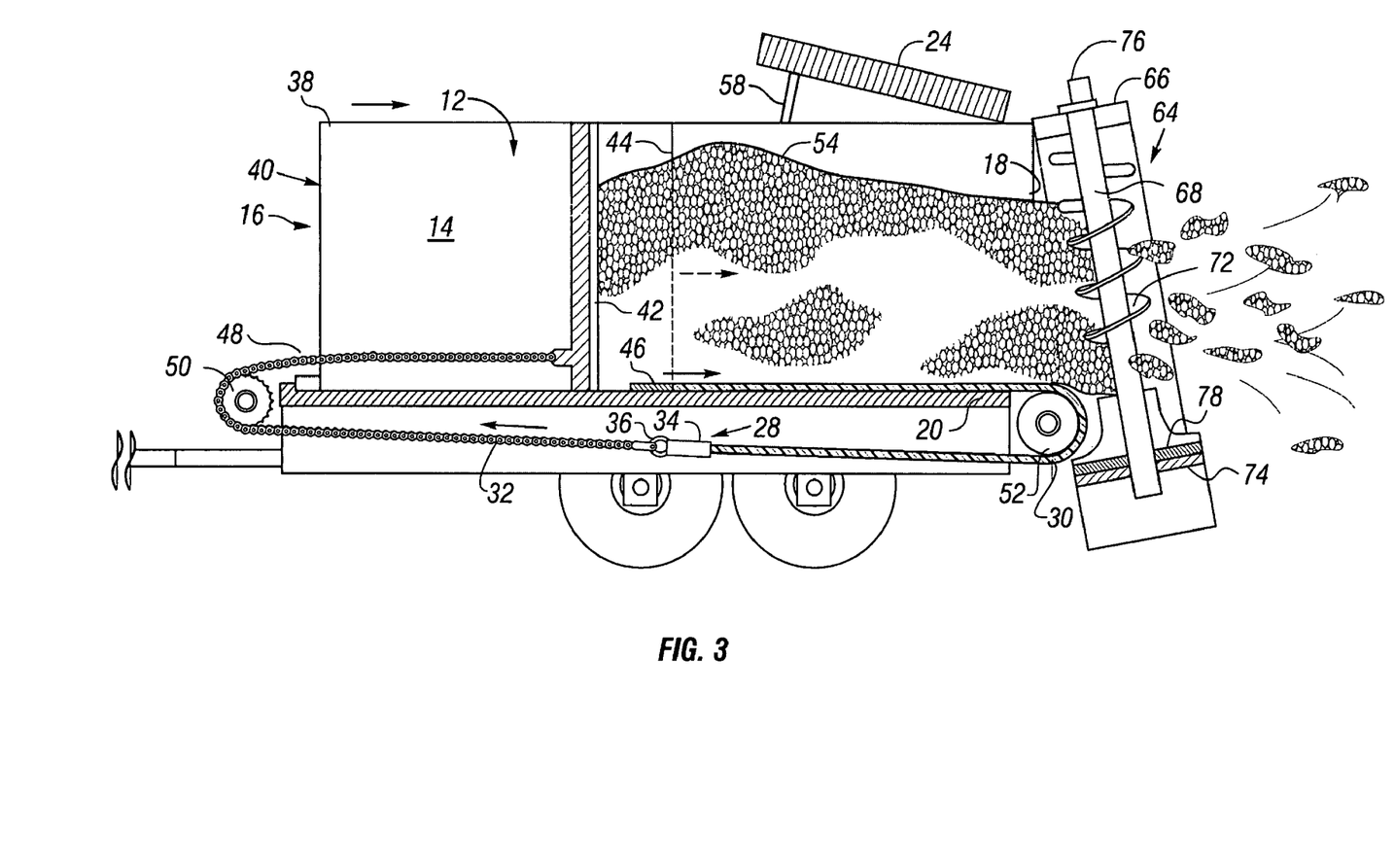
FIG. 3 is a longitudinal sectional view similar to FIG. 2, but showing the belt moved in a rearward direction from the position shown in FIG. 2.

A hydraulic motor 80 is mounted adjacent the front of the spreader box 12 and drives the chain/sprocket assembly 28 by rotating the sprocket 50. The result of this driving action is that the belt 30 and the sliding barrier 38 are moved rearwardly from their initial position shown in FIG. 2 toward the intermediary position shown in FIG. 3. Ultimately the barrier 38 moves completely to the rear of the spreader box 12, thereby discharging all of the material within the spreader box 12. The belt 30 and the chain assembly 28 can then be retracted to their position in FIG. 2 at the end of the cycle. The belt 30 covers the complete bottom wall 20 to the rear of barrier 38. That is, belt 20 spans the width of bottom wall 20, and also spans the length of wall 20 rearward of barrier 38. The edges of belt 30 fit within grooves 82. Thus the belt 30 underlies and supports the material 54 and carries it toward the open rear end 18 of box 12. Prior designs must either push or drag the material 54. Using belt 30 reduces the amount of power required to move the material 54.

During this motion it should be noted that the chain 32 never encounters the material within the material spreader. Only the belt encounters the material. Thus if repairs are necessary to the chain, it is not necessary to remove the material from the spreader box 12.

Figure 4:
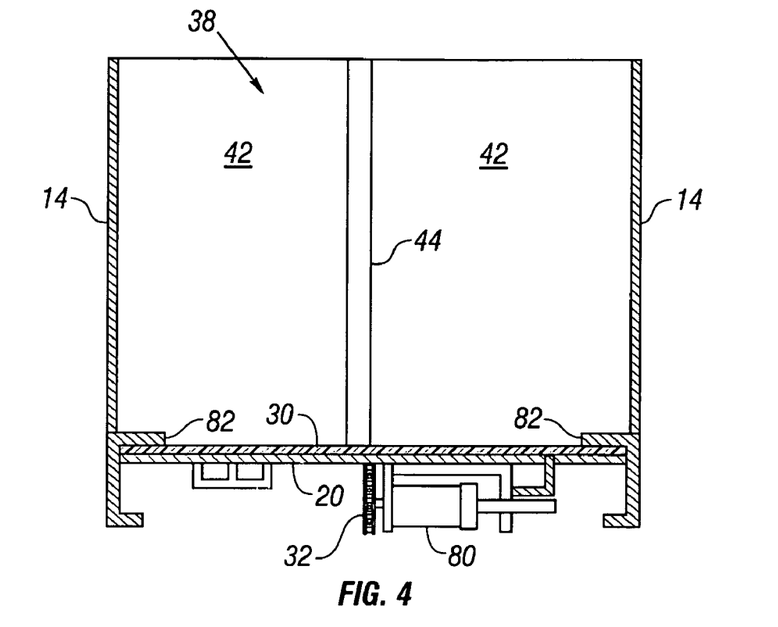
FIG. 4 is a sectional view taken along line 4—4 of FIG. 2.

Furthermore, the belt 30 has its lateral edges guided in slots 82 (FIG. 4). This ensures that all of the material is removed during the movement of the belt 30 and the sliding 38 to their rearward position.

Figure 6:
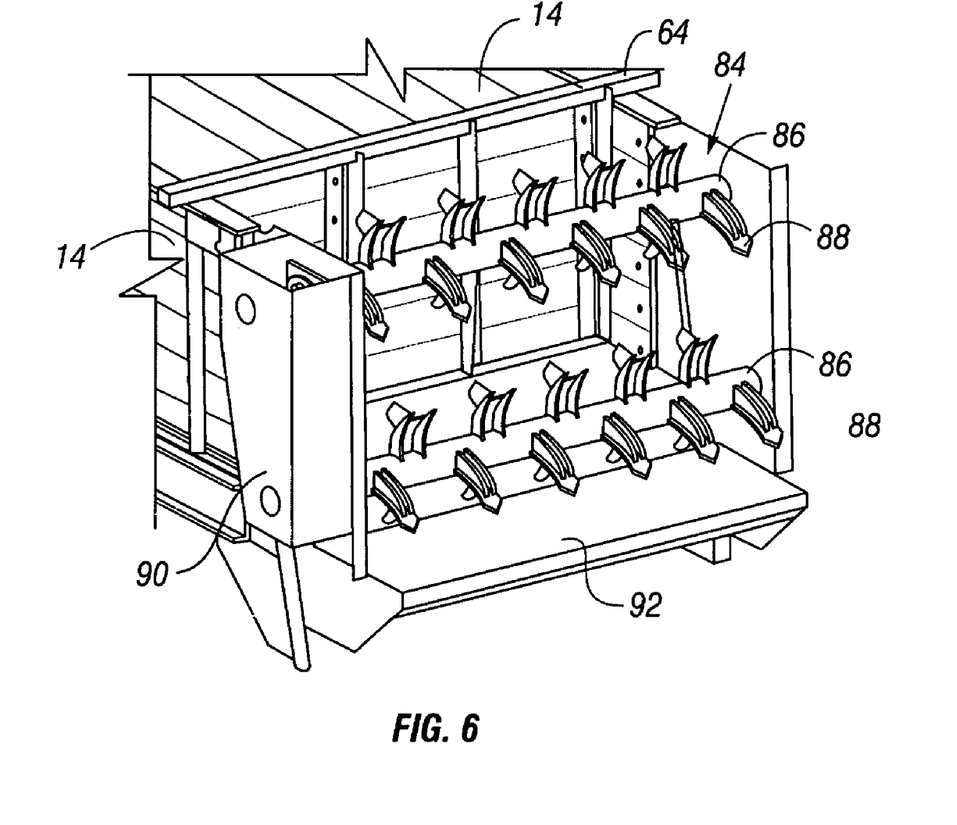
FIG. 6 is a pictorial view of an alternative form of beater bar assembly utilizing horizontally rotatable beater bars.

Referring to FIG. 6, a modified form of beater assembly is designated by the numeral 84. This beater assembly includes a plurality of horizontal shafts 86 which include beater bars 88 mounted thereon. A drive box 90 is driven by a hydraulic motor (not shown) to rotate the horizontal shafts 86. A platform 92 is positioned below the horizontal shafts 86 for causing the material to be distributed rearwardly after being encountered by the rotating beater bars 88 on the shafts 86.

Figure 7:
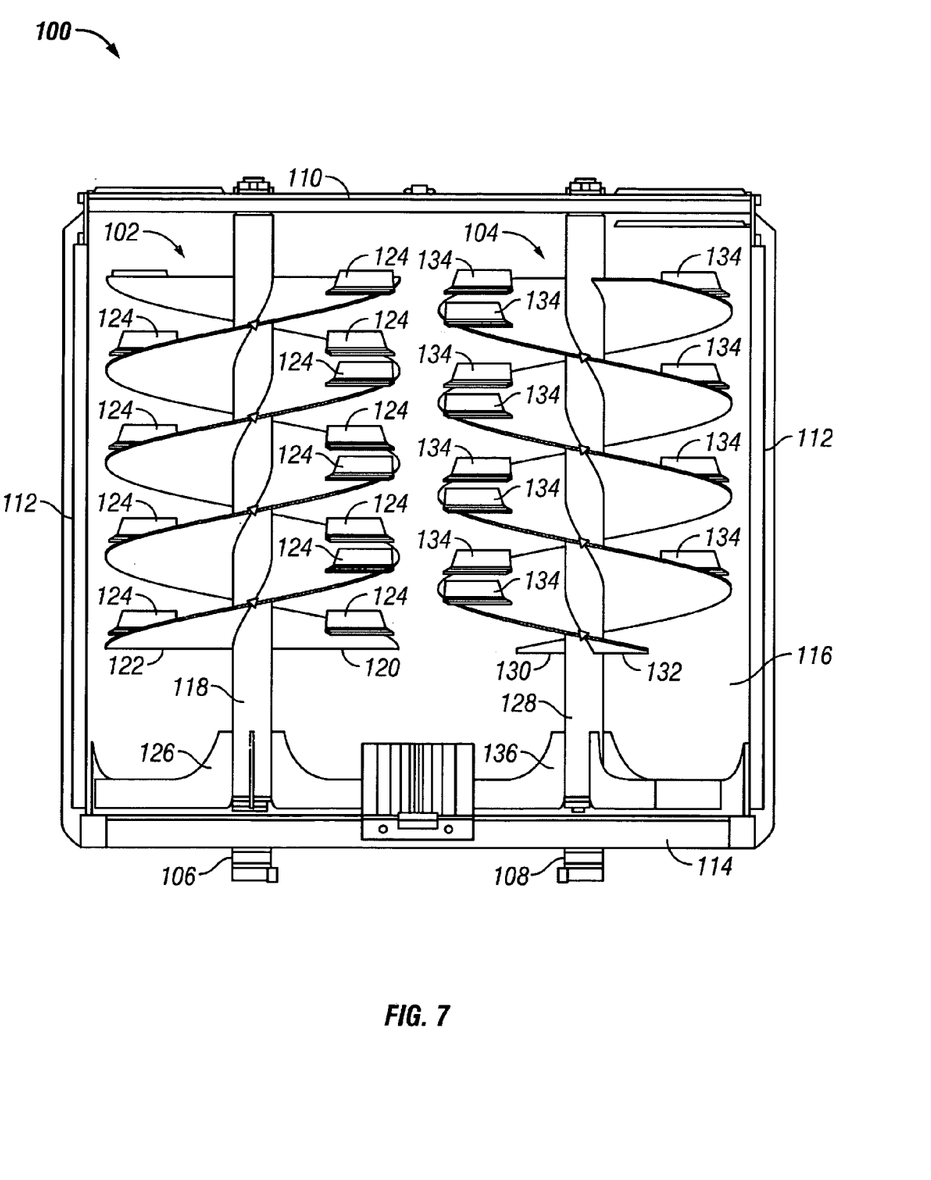
FIG. 7 is a rear elevational view of an alternative form of beater bar assembly utilizing lightings that extend along substantially the entire length of the shafts.

Referring to FIG. 7 a modified form of the beater assembly is designated by the numeral 100. Beater assembly 100 includes a first auger 102 and second auger 104 which are upstanding for rotation in opposite directions. Auger 102 rotates in a clockwise direction where as auger 104 operates in a counter-clockwise direction. A first hydraulic motor 106 drives the auger 102 and second hydraulic motor 108 drives the auger 104. Hydraulic motors 106, 108 are independently operated with respect to one another and include different hydraulic systems for driving them.

Each of the two shafts 102, 104 is rotated in upstanding position between a top frame 110 and a bottom frame 114 which are joined by two side frames 112 to create a rectangular opening 116.

First auger 102 includes a first auger shaft 118 having a first flighting 120 helically extending thereon and second flighting 122 also helically extending thereon. The flightings 120, 122 are referred as to double flighting. It should note that the double flighting 120, 122 extends most of the length of shaft 118, and there are no other breaker bars or beater bars mounted to the shaft 118. Only the flighting 120, 122 is included. Mounted on the outer periphery of the flighting 120, 122 are a plurality of beater plates 124 which facilitate in the distribution of the material to be spread. At the bottom of shaft 118 are a plurality of radially extending fling plates which fling the material outwardly from the rear of the frame assembly 110, 112, 114.

A second auger shaft 128 forms the central shaft for auger 104. It includes a first flighting 130 and a second flighting 132 which are mounted the same as the flightings 120, 122 of first auger shaft 118. However, they extend helically in the opposite direction. The reason for this is that the shafts 118, 128 are rotated in opposite directions and must fling the material rearwardly (toward the viewer as viewed in FIG. 7). A plurality of beater members 134 are bolted on the outer edges of the helical flightings 130, 132. At the bottom of shaft 128 are a plurality of radial extending fling plates 136.

Figure 8:
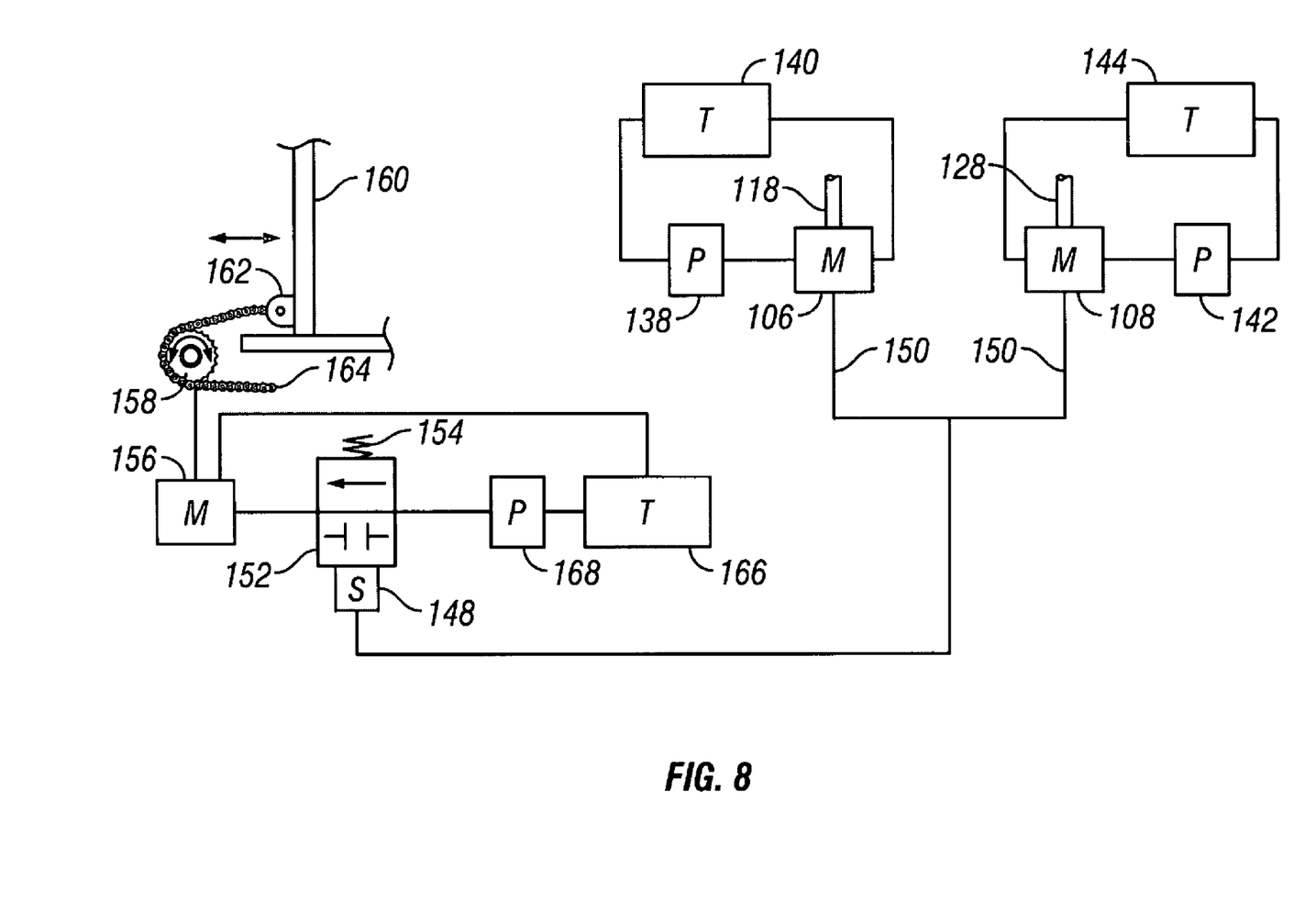
FIG. 8 is a schematic view of the hydraulics of the present invention.

Referring to FIG. 8 a schematic of the hydraulic and mechanical arrangement is shown. First and second motors 106, 108 are shown connected to first shaft 118 and second shaft 128 respectively. Motor 106 is connected to a hydraulic pump 138 and a tank 140 which are in a hydraulic system separate from that for driving motor 108. Motor 108 is enclosed in a separate and independent hydraulic system comprising a pump 142 and a tank 144.

A sensor 148 is connected to both motors 106 and 108 and is adapted to sense a build up in pressure in the motors 106, 108. This pressure build up can occur when the feeding plate 160 feeds the material too quickly to augers 102, 104. Sensor 148 is connected to motors 106, 108 by sensor connects 150. A valve 152 is driven by sensor 148. Valve 152 includes a valve spring 154 which biases the valve to a desired position. Valve 152 can be a continuous valve which continuously changes the hydraulic pressure provided to feed mechanism motor 156. Motor 156 is mechanically connected to a sprocket 158 for rotating it in two opposite directions. The feed plate 160 is movable to increase or decrease the rate at which the material is fed to the hydraulically driven augers 102, 104. A connecting gear 162 is connected to a chain 164 which extends around the sprocket 158. Motor 156 is connected to a tank 166 which in turn is connected to a hydraulic feed mechanism pump 168.

In operation, the hydraulic motors 106, 108 drive the auger shafts 118, 128 in opposite directions. As explained before, the hydraulic system and motors for operating shafts 118, 128 are independent and separate from one another. The sensor 148 senses a normal hydraulic pressure within motors 106, 108, and also is responsive to sensing a build up of hydraulic pressure beyond the normal rate in either motor 106 or 108. When such a pressure build up occurs, the sensor 148 causes the valve 152 to move either to its closed position or to move to an alternative position partially restricting the flow of fluid to motor 156. This results in either slowing down the feed plate 160 or stopping it altogether.

Several things contribute to the low vibration that is created by the rotation of first and second augers 102, 104. One of these features is the identical nature of the augers. Another feature is the use of double flighting. Yet another feature is the fact that the flightings extend the same distances on shafts 118, 128 and extend substantially the entire length. Maintaining the structure of the augers 102, 104 is possible to reduce the vibration caused by other auger configurations.

Also, other types of spreader attachments can be used in addition to the vertical and horizontal beaters. For example a side discharge expeller spreader attachment may be used without detracting from the invention.

Furthermore a cable and drum can replace the chain and sprocket assembly to accomplish the same result. A continuous belt may also be used.

While the drawings show a trailer mounted unit, the unit may also be truck mounted. The rate of discharge can be controlled by varying the hydraulic flow to motor 80.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstance may suggest or render expedient without departing from the spirit or scope of the invention as further defined in the following claims.

The invention claimed is:

1. A material spreader for spreading a quantity of material comprising:
    a material spreader box having a bottom wall and opposite side walls forming a storage chamber for storing the quantity of material;
    at least a first upstanding auger and a second upstanding auger, each having an upstanding shaft of predetermined length having helical flighting extending thereon, the first and second augers being mounted to the spreader box for rotation about first and second upstanding axes respectively;
    a first auger drive for causing the first upstanding auger to rotate;
    a second auger drive for causing the second upstanding auger to rotate;
    the first and second auger drives being independent from one another;

a feed mechanism underlying and supporting the quantity of material within the spreader box that is movable between first and second positions at a variable rate, the feed mechanism causing the quantity of material within the chamber to be fed to the first and second upstanding augers for spreading the material on the ground during rotation of the first and second augers.

2. The material spreader according to claim 1 wherein the first and second auger drives are first and second hydraulic motors, respectively.

3. The material spreader according to claim 1 wherein the flighting is double flighting.

4. The material spreader according to claim 1 wherein a plurality of beater members are mounted on the fighting on the first and second augers.

5. The material spreader according to claim 2 wherein a sensor is responsive to pressure buildup in either of the first and second hydraulic motors to cause the feed mechanism to slow down its movement between the first and second positions.

6. A material spreader for spreading a quantity of material comprising:
   a material spreader box having a bottom wall and opposite side walls forming a storage chamber for storing the quantity of material;
   at least a first upstanding auger and a second upstanding auger mounted to the spreader box for rotation about first and second upstanding axes respectively;
   at least a first hydraulic drive connected to the first and second augers for rotating the first and second augers;
   a feed mechanism within the spreader box that is movable between first and second positions to cause the quantity of material within the chamber to be fed to the first and second upstanding augers for spreading the material on the ground during rotation of the first and second augers;
   the feed mechanism being capable of moving between the first and second positions between a stopped rate and a maximum rate;
   a sensor connected between the hydraulic drive and the feed mechanism and being responsive to pressure buildup within the hydraulic drive to cause the feed mechanism to slow down or stop the rate at which the feed mechanism moves between the first and second positions.

7. The material spreader according to claim 6 and further comprising a second hydraulic drive in addition to the first hydraulic drive, the first and second hydraulic drives independently driving the first and second augers, respectively.

8. A material spreader for spreading a quantity of material comprising:
   a material spreader box having a bottom wall and opposite side walls forming a storage chamber for storing the quantity of material;
   at least a first upstanding auger and a second upstanding auger mounted to the spreader box for rotation about first and second upstanding axes respectively;
   a first auger drive for causing the first upstanding auger to rotate;
   a second auger drive for causing the second upstanding auger to rotate;
   the first and second auger drives being independent from one another;
   a feed mechanism within the spreader box that is movable between first and second positions, the feed mechanism causing the quantity of material within the chamber to be fed to the first and second upstanding augers for spreading the material on the ground during rotation of the first and second augers; and
   the first and second augers each include an upstanding shaft of predetermined length having helical fighting extending thereon.

9. The material spreader according to claim 8 wherein the fighting is double fighting.

10. The material spreader according to claim 8 wherein a plurality of beater members are mounted on the fighting on the first and second augers.

* * * * *

UNITED STATES PATENT AND TRADEMARK OFFICE
CERTIFICATE OF CORRECTION

PATENT NO.       : 7,191,965 B2  
APPLICATION NO.  : 11/224174  
DATED            : March 20, 2007  
INVENTOR(S)      : Neier et al.

It is certified that error appears in the above-identified patent and that said Letters Patent is hereby corrected as shown below:

Col. 7, Claim 4, line 14:
DELETE after on the "fighting"
ADD after on the --flighting--

Col. 8, Claim 8, line 30:
DELETE after helical "fighting"
ADD after helical --flighting--

Col. 8, Claim 9, line 33:
DELETE "fighting is double fighting".
ADD --flighting is double flighting--.

Col. 8, Claim 10, line 35:
DELETE after on the "fighting"
ADD after on the --flighting--

Signed and Sealed this

Eighth Day of May, 2007

JON W. DUDAS
*Director of the United States Patent and Trademark Office*